L. B. ARTIGUE.
FAUCET ATTACHMENT.
APPLICATION FILED MAR. 25, 1912. RENEWED APR. 30, 1914.
1,120,661. Patented Dec. 15, 1914.
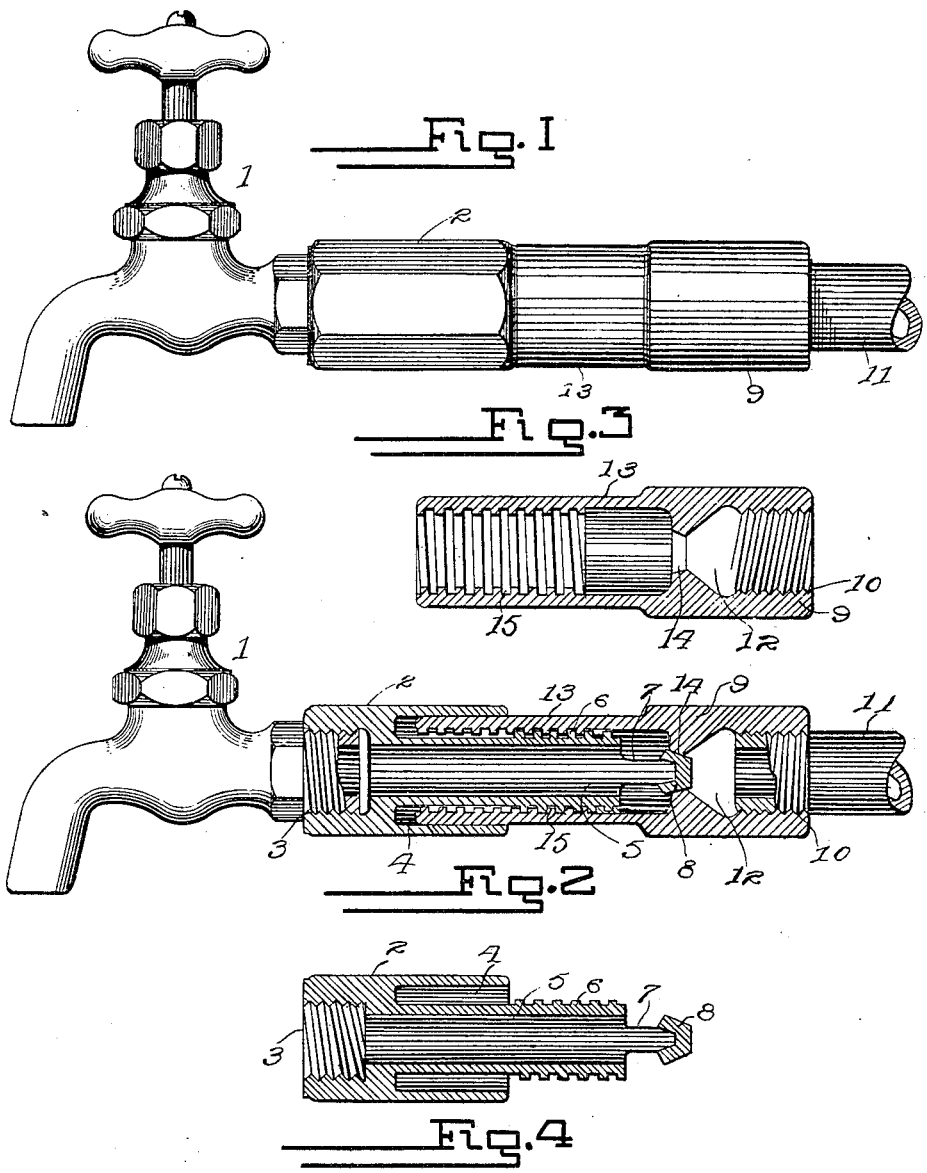

UNITED STATES PATENT OFFICE.

LEON B. ARTIGUE, OF LOS ANGELES, CALIFORNIA, ASSIGNOR OF ONE-HALF TO FRANK X. AMMANN, OF LOS ANGELES, CALIFORNIA.

FAUCET ATTACHMENT.

1,120,661. Specification of Letters Patent. Patented Dec. 15, 1914.

Application filed March 25, 1912, Serial No. 685,936. Renewed April 30, 1914. Serial No. 835,543.

*To all whom it may concern:*

Be it known that I, LEON B. ARTIGUE, a citizen of the United States, residing at Los Angeles, in the county of Los Angeles and State of California, have invented certain new and useful Improvements in Faucet Attachments, of which the following is a specification, reference being had therein to the accompanying drawing.

This invention relates to faucets and has special reference to that class of faucets in which means are provided adjacent to the faucet whereby a water pipe can be closed when the faucet is removed.

The invention has for its object to provide an improved device of this kind by means of which the water pipe can be readily closed when the faucet is removed.

Referring to the accompanying drawings:—Figure 1 is a view of a faucet with the improvement made in accordance with this invention applied thereto, in conjunction with a water pipe. Fig. 2 is a view of the faucet with means for shutting off the water when the faucet is removed shown in longitudinal section. Fig. 3 is a detail view in longitudinal section of a portion of the means for shutting off the water when the faucet is removed. Fig. 4 is a detail view in longitudinal section of another portion of the means for shutting off the water.

In the accompanying drawings, 1 indicates an ordinary faucet to which is secured a plug or casing 2 having a threaded socket 3 into which the threaded end of the faucet is screwed. The plug 2 has a hexagonal outer face and is formed with a chamber 4 through which projects a tube 5 formed integral with the plug 2 and communicating with the threaded socket 3, said tube 5 projecting beyond the plug 2 and formed with a threaded end 6 and with a projection 7 at its open end provided with a valve 8. A body or second plug 9 is provided which is formed with a threaded socket 10 into which is screwed the threaded end of a water pipe 11 communicating with a chamber or pocket 12 in the plug 9 and opening into a reduced tubular projection 13 formed integral with the plug 9, said opening being provided with a valve seat 14 having beveled sides in which is adapted to be seated the valve 8 at the end of the tubular projection 5. The inner surface of the tubular projection 13 is provided with threads 15 into which is adapted to be screwed the threaded end 6 of the tubular projection 5. The parts hereinbefore described are assembled by screwing the faucet on to the plug 2 and then screwing the tubular projection 5 into the tubular projection 13, the end of the latter extending into the annular chamber 4 in the plug 2. When the faucet is in use the tubular projection 5 is screwed into the tubular projection 13 only far enough to hold the valve 8 from the valve seat 14.

When it is desired to remove the faucet 1 for repair or for other reasons, the tubular projection 5 is screwed into the tubular projection 13 so as to seat the valve 8 on the valve seat 14 thereby shutting off the water supply through the pipe 11. The faucet 1 may then be unscrewed from the plug 2.

It will be seen that by means of this construction it will not be necessary to shut off the water main from the pipe 11, and the supply through the pipe 11 may be readily cut off by closing the valve 8 thereby enabling the faucet to be readily removed.

What I claim is:—

A water supply pipe comprising a body having an internally threaded opening adapted to fit over a supply pipe and an enlarged pocket adjacent said threaded opening, said pocket terminating in a narrow aperture constituting a valve seat and provided with beveled sides, said body also having a forwardly extending reduced tubular body portion provided with internal threads, an outer casing having a hexagonal outer face and a sleeve portion positioned upon said reduced tubular body portion and slidable thereover and fitting snugly thereon and having a hollow centrally arranged extension terminating in a reduced valve head spaced from the end of said centrally arranged extension, the latter provided with threads upon its outer face meshing with the threads in the said reduced tubular body portion whereby said outer casing is adjustable upon said first mentioned body, and a faucet carried by said outer casing.

In testimony whereof I hereunto affix my signature in presence of two witnesses.

LEON B. ARTIGUE.

Witnesses:
L. C. ACKLEY,
GEO. L. MARLOW.

Copies of this patent may be obtained for five cents each, by addressing the "Commissioner of Patents Washington, D. C."